(12) United States Patent
Visscher

(10) Patent No.: US 6,368,547 B1
(45) Date of Patent: Apr. 9, 2002

(54) METHOD FOR PRODUCING AN EXTRUDED HOLLOW PLASTIC SECTION

(75) Inventor: Jan Visscher, Lutten (NL)

(73) Assignee: Wavin B.V., Zwolle (NL)

( * ) Notice: Subject to any disclaimer, the term of this patent is extended or adjusted under 35 U.S.C. 154(b) by 0 days.

(21) Appl. No.: 09/366,956

(22) Filed: Aug. 4, 1999

Related U.S. Application Data

(63) Continuation of application No. PCT/NL98/00073, filed on Feb. 6, 1998.

(30) Foreign Application Priority Data

Feb. 14, 1997 (NL) .............................................. 1005282

(51) Int. Cl.[7] .............................................. B29C 47/78
(52) U.S. Cl. .................... 264/558; 264/209.4; 264/237; 264/348; 264/560; 264/566; 264/569; 425/326.1; 425/393; 425/404
(58) Field of Search ................................. 264/558, 237, 264/560, 348, 565, 566, 569, 209.4, 210.1, 211.13; 425/393, 404, 326.1

(56) References Cited

U.S. PATENT DOCUMENTS

| | | | |
|---|---|---|---|
| 2,432,260 A | * | 7/1947 | Slaughter |
| 3,522,337 A | * | 7/1970 | Ball |
| 3,812,230 A | * | 5/1974 | Takahashi |
| 4,008,022 A | * | 2/1977 | Carrico |
| 4,740,146 A | | 4/1988 | Angelbeck |
| 5,484,557 A | | 1/1996 | Groeblacher |
| 6,019,934 A | * | 2/2000 | Schulte |
| 6,214,283 B1 | * | 4/2001 | Visscher et al. |

FOREIGN PATENT DOCUMENTS

| | | |
|---|---|---|
| DE | 1704 972 | 7/1971 |
| WO | WO 96/23644 | 8/1996 |

* cited by examiner

Primary Examiner—Mark Eashoo
(74) Attorney, Agent, or Firm—Blank Rome Comisky & McCauley LLP

(57) ABSTRACT

Apparatus and method for producing a hollow plastic section by extrusion through a die in a horizontal direction. The die has an inner mandrel which forms the cavity in the section. A first sealing plug and a second sealing plug, which sealing plugs are situated at a distance from one another downstream of the inner mandrel are attached to the inner mandrel. The sealing plugs are designed, during operation of the apparatus, to lie in the hollow section, such that they are sealed against the section, so that the sealing plugs and the section delimit a compartment in the cavity of the section. The compartment is filled with a liquid during operation of the apparatus. Vent means are located in the compartment for receiving and discharging gases or vapor which collects at the highest point of the compartment.

24 Claims, 1 Drawing Sheet

METHOD FOR PRODUCING AN EXTRUDED HOLLOW PLASTIC SECTION

CROSS-REFERENCE TO RELATED APPLICATIONS

This is a continuation application of PCT/NL98/00073 filed Feb. 6, 1998.

FIELD OF THE INVENTION

The present invention relates to an apparatus for producing an extruded hollow plastic section in accordance with the preamble of claim 1. Such an apparatus for producing an extruded plastic tube is known, for example, from NL 7612518 and NL 1001259.

BACKGROUND OF THE INVENTION

In the apparatus which is known from NL 7612518, the first sealing plug is disposed immediately downstream of the inner mandrel of the die, between the die and the external calibration device, while the second sealing plug is situated downstream of the external cooling device. The two sealing plugs together with the extruded tube delimit a cooling water compartment in the inner chamber of the tube. A feed line is provided for filling cooling water into said compartment. Furthermore, a discharge line and suitable pump means are provided, so that cooling water can be circulated through the cooling water compartment, with the result that the extruded tube is cooled internally.

The closure obtained by the first sealing plug has to be very reliably liquid-tight, in order to prevent the hot inner mandrel of the die from coming into contact with the cooling water. In practice, such contact leads to considerable disruption or jamming of the extrusion process and may even damage the inner mandrel.

It is known that if an extruded plastic tube is cooled not only externally but also internally it is possible to achieve a considerably higher cooling capacity than if cooling takes place only externally, this increased cooling capacity theoretically being greater by a factor of four. An important practical advantage of this is that the length of the cooling assembly of the extrusion apparatus can be made considerably shorter. It is also possible, if the length of the cooling assembly is kept the same, to increase the output of the extruder.

Another generally accepted advantage of the combination of external and internal cooling of a plastic tube, in particular thick-walled pipe, by comparison with exclusively external cooling, is that the tube coming out of the extruder then quickly acquires a cooled, and hence relatively strong layer, both on the internal circumference and on the external circumference. The two cooled layers enclose the warm, soft plastic material between them, thus preventing, or at least counteracting, the possibility of this soft plastic material sagging downwards, resulting in an undesired shape of the tube.

Despite the abovementioned known advantages internal cooling, in particular in combination with extrenal cooling, is little used in the industry for the production of extruded hollow plastic sections. This is because the use of internal cooling leads to a number of problems which have hitherto not been solved satisfactorily. One of these problems is that the known devices and methods for internal cooling do not allow a uniform cooling of the extruded section, which has the undesirable effect that the inside of the extruded section showns an irregular surface and the wall thickness also exhibits undesirable deviations. Another problem relates to the constriction of the plastic section coming out of the extruder. Particularly when extruding polyolefin tubes, the extruded mass of plastic material comes out of the die at a speed which is lower than the speed of the tube at the location of the drawing or hauloff machine. As a result, the wall thickness of the tube decreases and also the diameter of the tube becomes smaller. Since a cold and strong layer is rapidly formed on the inside of the tube if internal cooling is used, this layer will start to become creased as the diameter of the tube is reduced.

SUMMARY OF THE INVENTION

The object of the present invention is to provide an apparatus and a method with which the internal cooling process in the horizontal extrusion of hollow plastic sections can be improved and controlled better, enabling better results to be achieved.

The present invention provides an apparatus which defines a path for said extruded plastic section which is such that the compartment which is filled with liquid has a highest point at a predetermined location, and in that the apparatus further comprises vent means for discharging from the liquid filled compartment gas or vapor which collects at the highest point of the said compartment.

In an embodiment which is advantageous in practice, the two sealing plugs bounding said liquid filled compartment are rigidly fixed by suitable attachment means to said inner mandrel of the die, and the rigid assembly of the die and the attached sealing plugs is directed at an incline with respect to the horizontal.

In another embodiment the external calibration device is vertically offset from the die of the extruder, so that between them an inclined path is formed for the extruded tube and the highest point of the liquid filled compartment can be obtained. In this arrangement both the die and the external calibration device can be arranged horizontally as a slight bending of the still soft extruded section is allowable in many cases. It is also envisaged that the die is oriented horizontally and that the two sealing plugs bounding the liquid filled compartment are vertically offset from one another to obtain an inclined path for the extruded section.

The present invention is based on the insight that, particularly if water is used for internally cooling the extruded plastic section, air bubbles are released from the cooling water when the water heats up as a result of coming into contact with the extruded plastic section which comes out of the extruder at a high temperature. The direct contact between the plastic section and the cooling water may also result in the water beginning to boil in certain locations, thus producing steam. The air bubbles and the steam accumulate in the top of the inner chamber in the plastic section. At the location where air and steam are situated in the top of the inner chamber in the plastic section, the plastic section is not in direct contact with the cooling water. The cooling of the plastic section is then no longer uniform when viewed in the circumferential direction of the plastic section. However, there is a continuous feed of still relatively cold cooling water at the location along the inner wall of the plastic section where the steam bubbles and air bubbles are formed, so that by contrast the plastic section is cooled more strongly at that location.

The present invention provides for the extruded section to be supported and guided by the extrusion apparatus in such a manner that the liquid-filled compartment has a highest point at a predetermined location and that the apparatus has vent means arranged to remove the gas and air bubbles which collect at said location. The air bubbles and vapour bubbles rising in the liquid-filled compartment move automatically towards the highest point, where they are discharged through the vent means.

The measure according to the invention is also advantageous when combined with measuring the wall thickness of the extruded section. It is usual to measure the wall thickness of an extruded section continuously, in order thus to control the gap of the die so as to obtain a wall thickness and shape of the section which are as uniform as possible. It has been found that if internal cooling is used, with a sealing plug which lies inside the plastic section forming the separation between the inner mandrel of the die and a compartment which is filled with cooling medium, it is extremely important that the wall thickness of the section coming out of the die be controlled accurately, in order to ensure the sealing action of the sealing plug. This is the case in particular if the cooling medium is pressurized. If the extruded section, which at the location of the sealing plug situated directly downstream of the die is still very hot and therefore soft, is locally thinner, it will be easy for cooling medium to leak past the sealing plug at that location and come into contact with the die. This situation is highly disadvantageous.

It is usual to carry out the wall-thickness measurement using ultrasound, each interface between different materials, for example between the plastic material of the section and a liquid, providing an echo. Known ultrasonic wall-thickness measuring devices are designed to use the echoes received to determine the wall thickness and the cross-sectional shape of the extruded plastic section. According to a preferred embodiment of the invention, it is provided for a liquid-filled compartment in the plastic section to be present at the location of the ultrasonic wall-thickness measuring device, said compartment being formed by a sealing plug upstream and a sealing plug downstream of said measuring device, and for vent means to be provided for discharging from that compartment gas or vapour which accumulates at the highest point of the said compartment. The fact that according to the invention the entire compartment is filled with liquid avoids disruption caused by air or vapour which would otherwise be present. The present invention also provides for an ultrasonic sound emitted by the wall-thickness measuring device to pass at a location from outside through the wall of the plastic section, resulting in two echoes, and then to propagate through the liquid in the plastic section, after which it again passes through the wall of the plastic section at the diametrically opposite location, resulting in a further two echoes. The wall-thickness measuring device can use the four echoes to determine the wall thickness at two locations which are situated diametrically opposite one another.

BRIEF DESCRIPTION OF THE DRAWINGS

The invention will be explained in more detail below with reference to the drawing, in which.

DESCRIPTION OF THE PREFERRED EMBODIMENT

Figure 1:
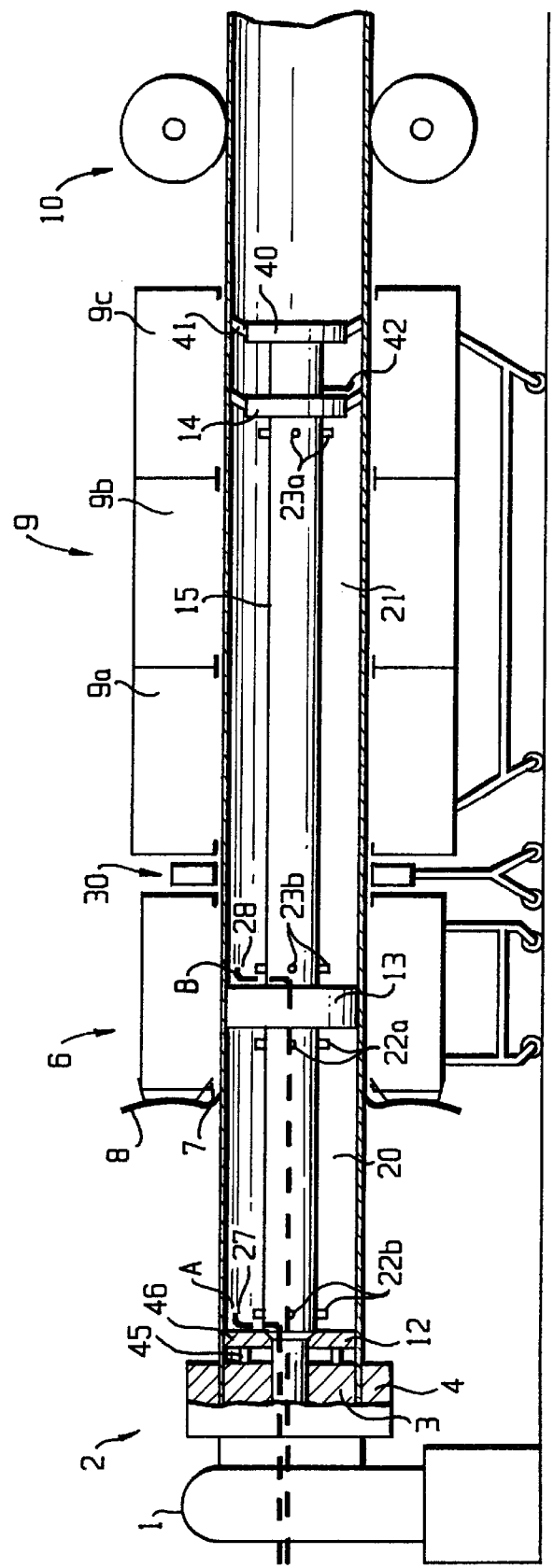
FIG. 1 shows a diagrammatic side view, partially in section, of an exemplary embodiment of the apparatus according to the invention.

FIG. 1 shows an extruder 1 with a die 2 for extruding thermoplastic material. The die 2 has an inner mandrel 3 and an outer barrel 4, which inner mandrel 3 and outer barrel 4 delimit a die annulus, which the extruded plastic material comes out of in the form of a cylindrical tube 5.

An external calibration or sizing device 6, which is designed as a vacuum calibration device, is disposed downstream of the extruder 1. The device 6 comprises a sleeve (not shown) having an inner diameter corresponding to the desired external diameter of the tube 5. Water-feed means 7 are provided on that side of the vacuum calibration device 6 which faces towards the extruder 1, for the purpose of forming a film of water on the outside of the tube 5. In order to prevent this film of water from coming into contact with the hot die 2, water-discharge means 8 are disposed between the water-feed means 7 and the die 2, these water-discharge means in the present example taking the form of air-jet nozzles which are directed towards the tube 5 and the vaccum calibration device 6. In another embodiment, a water-suction device could be provided.

The vacuum calibration device 6 is arranged displaceably with respect to the die 2 and can be displaced between a position in which it is virtually against the die 2 and a position in which it is situated away from the die 2; the latter position is shown in FIG. 1.

An external cooling device 9 is disposed downstream of the vacuum calibration device 6. This external cooling device 9 comprises a plurality of compartments 9a, 9b, 9c, which are situated one behind the other and are filled with cooling water. A drawing or hauloff device 10, which engages on the tube 5, is situated downstream of the external cooling device 9.

FIG. 1 furthermore diagrammatically shows an internal cooling device for internally cooling the extruded tube 5. The internal cooling device comprises a first sealing plug 12, which is fixed to the inner mandrel 3 of the die 2. The first sealing plug 12 lies in the inner chamber of the tube 5 and forms an absolutely liquid-tight seal against the interior surface of the tube 5. The internal cooling device furthermore comprises a second sealing plug 13 and a third sealing plug 14. These sealing plugs 13, 14 also form a liquid-tight seal against the interior surface of the tube 5. The second sealing plug 13 is preferably designed as described in NL 1001259. The third sealing plug 14 is provided with flexible sealing lips engaging on the tube 5.

The second and third sealing plugs 13, 14 are arranged on a rigid tubular attachment element which lies in the centre of the tube 5, thus forming therewith an elongate and rigid internal cooling member 15 which can be manipulated as a single unit. The inner mandrel 3 and the internal cooling member 15 are provided with interacting coupling means e.g a bajonet or screw-thread connection (not shown), so that the internal cooling member 15 can be attached releaseably to the inner mandrel 3. These coupling means are preferably designed in such a way that the internal cooling member 15 can be attached to the inner mandrel 3 by waiting, after starting the extruder 1, until the extrusion process has become stable, then cutting off the tube 5 downstream of the drawing device 10, then pushing the internal cooling member 15 into the tube 5 and subsequently fixing it to the inner mandrel 3.

The first sealing plug 12 and the second sealing plug 13 lie at a distance axially spaced from one another, when seen in the direction of extrusion, and delimit a first compartment 20 in the inner chamber of the tube 5. The second sealing plug 13 and the third sealing plug 14 lie at a distance from one another, when seen in the direction of extrusion, and delimit a second compartment 21 in the inner chamber of the tube 5.

A set of feed lines and discharge lines for cooling water, which are respectively indicated by reference numerals 22a, 22b and 23a, 23b, are present for each of the compartments 20, 21. These lines 22a, 22b, 23a, 23b run, via the central tube of the internal cooling member 15, through the inner mandrel 3 of the extruder 1 and are connected to a pump device (not shown) and possibly to a heat exchanger. Via the lines 22a, 22b, 23a, 23b, each of the compartments 20, 21 can be filled with cooling water and cooling water can be circulated through each of the compartments 20, 21.

In the shown embodiment the die 2, the vacuum calibration device 6, the external cooling device 9, and the internal cooling member 15, which is connected to the inner mandrel 3 of the die 2, are disposed at a slight angle with respect to the horizontal, directed downwards when seen in the direction of extrusion. This inclined arrangement means that the compartments 20, 21, which are filled with cooling water, each have a single highest point, which is denoted respectively by A and B in FIG. 1, at a predetermined location, in this case close to the sealing plug, respectively 12, 13, which delimits each compartment 20, 21 at the upstream end thereof.

At the first sealing plug 12 and the second sealing plug 13, the apparatus further comprises a vent pipe, respectively 27, 28, with an inlet opening very close to the interior surface of the wall of the tube 5 at the highest point A, B of the compartment 20, 21 in question. The gas or vapour which accumulates at the highest point A, B of respectively the compartment 20, 21 can be discharged to the outside via the corresponding vent pipe 27, 28. Preferably, each of the vent pipes 27, 28 is provided with a valve for opening and closing the vent pipe 27, 28. The valve can be actuated on command, but may also operate automatically, so that the valve opens as soon as a specific quantity of gas and vapour have accumulated at the highest point.

The angle of inclination of the path followed by the tube 5 as it passes each of the compartments 20, 21 only has to be small in order to achieve the effect described above and obtain a highest point at a predetermined location somewhere between the sealing plugs. In practice, it is advantageous if the angle is less than 5%, and a value which is advantageous in practice is approximately 1% (1 centimetre per metre). It is not necessary for the entire extrusion apparatus, i.e. including, for example, the drawing device 10, to be at an angle to the horizontal in order for each liquid-filled compartment 20, 21 in the tube 5 to have a highest point. This is because it is also possible to allow the tube 5 to run inclined to the horizontal over part of the length of the apparatus, while the tube 5 runs precisely horizontally further on in the apparatus. This is because the tube 5 is still sufficiently soft for a slightly "undulating path" through the apparatus not to be disadvantageous for the tube 5 ultimately obtained. Such an undulating path can be achieved by a suitable arrangement of the components of the apparatus which guide and support the tube 5 coming out of the die 2, such as the die, the internal cooling device, the external calibration sleeve, etc. In principle, it is also possible that the apparatus forms such a path for the extruded tube 5 that the highest point of a liquid-filled compartment is not close to one of its ends, but rather at a predetermined location between them. The vent pipe would then have an inlet opening at said location.

In a variant of the apparatus illustrated in FIG. 1, the cooling-water-discharge lines 22b and 23b are absent, and cooling water is discharged only via the vent pipes 27 and 28, which are provided with an inlet opening at the highest point A, B of the compartment 20, 21 in question. As a result, air and steam are discharged together with the cooling water flowing out of the compartment.

The apparatus furthermore comprises an ultrasonic wall-thickness measuring device 30 for measuring the wall thickness of the extruder tube 5. The wall-thickness measuring device 30 is disposed downstream of the vacuum calibration device 6, when seen in the direction of extrusion. Both the vacuum calibration device 6 and the external cooling device 9 can be displaced with respect to the extruder 1.

The wall-thickness measuring device 30 comprises, for example, a transmitting-and-receiving head for ultrasonic sound, which rotates outside around the tube 5 (not shown) as is known from the prior art. During operation of the extrusion apparatus, the wall-thickness measuring device 30 is situated at the position of the compartment 20 which is filled with cooling water, just upstream of the second sealing plug 13, i.e. at an axial distance away from the highest point A of the compartment 20. A film of liquid is produced in a known manner between the transmitting-and-receiving head and the outside of the tube 5. An ultrasonic signal emitted by the head towards the axis of the tube 5 produces two echoes when the signal passes through the wall of the tube 5 close to the head. However, since the compartment 20 is completely filled with cooling water, the ultrasonic sound propagates further through the cooling water and then passes again through the wall of the tube 5 diametrically opposite the head. This second occasion when the sound passes through the tube wall again produces two echoes. The wall-thickness measuring device 30 is designed to recognize these four echoes, and one head can then be used to determine the wall thickness of the tube 5 at two diametrically opposite locations. If there were no vent means provided, there would be considerable risk of the air and vapour in the upper part of the compartment 20 interfering with the wall-thickness measurement, since there would then not be a clear interface, when seen in the circumferential direction of the tube 5, at the location of the inside of the tube wall. Furthermore, any air or vapour present will interfere with or prevent the abovementioned propagation of the ultrasonic sound through the compartment 20. In order to achieve the abovementioned effect with four echoes, the central attachment body of the internal cooling member 15 should have a small cross-section.

The wall-thickness measuring device 30 may have one single transmitting-and-receiving head, which continuously rotates through 360° around the tube 5, or it may have a plurality of heads, for example four heads which are distributed around the circumference of the tube 5 and each perform a reciprocating movement of 90°. If the diameter of the tube 5 is small, provision may be made to arrange the transmitting-and-receiving heads one behind the other, when seen in the direction of extrusion.

The internal cooling device 15 is designed to circulate cooling liquid in the compartment 21 at a lower temperature than in the compartment 20, which is situated closer to the extruder 1.

The internal cooling member 15 comprises a fourth sealing plug 40 at a distance downstream of the sealing plug 14 which delimits compartment 21 for cooling water, which fourth sealing plug 40, together with the sealing plug 14, delimits a liquid-suction compartment 41. The internal cooling member 15 is provided with a line 42, via which line 42 cooling water which has managed to pass by the third sealing plug 14 can be sucked out. The line 42 has a suction opening close to the lowest point of the compartment 41.

The first sealing plug 12 is situated just downstream of the inner mandrel 3, to which it is attached with the interposition of a thermal insulation member 45, in particular a ring of plastic material, such as polytetrafluorethylene.

The first sealing plug 12 has a dimensionally stable sealing surface 46, which during operation of the apparatus bears in a sealing manner against the inside of the extruded tube 5. The annular sealing surface 46 is made of metal. In order to prevent the hot plastic material from adhering to the sealing surface, the sealing surface 46 is kept at a low temperature. In order to keep the sealing surface 46 at a low temperature even when starting up the installation, when the internal cooling member 15 has not yet been attached, separate cooling means (not shown) are provided. If appropriate, the sealing surface 46 may be provided with one or more peripheral grooves which are connected to a vacuum pump, in order to ensure that the tube 5 bears firmly against the sealing surface 46.

The following procedure is used to extrude the tube 5.

Firstly, the extruder 1 is set in operation, with the result that the tube 5 made of thermoplastic material is pushed outwards from the die 2. It should be noted here that it is sometimes desirable during the start-up procedure of an extrusion process for producing plastic tubular sections to use a different plastic material from the plastic which is intended to be used ultimately, this "start-up material" having a better stability at high temperatures.

After a period of time, the tube 5 coming out of the extruder 1 has a sufficient length for the tube 5 to reach the drawing device 10. Until this moment in the start-up procedure is reached, it is preferred to make use of a flexible element, such as a wire or cord, which is arranged between the compressed end of the tube 5 and a tube (not shown) which is located in the drawing device 10. Setting the drawing device 10 in action then pulls the tube 5. During start-up, the vacuum calibration device 6 is situated in its position away from the die 2 (cf. FIG. 1). As soon as the tube 5 passes through the vacuum calibration device 6, the latter is set in operation, thus applying a vacuum to the tube 5, so that the tube 5 is calibrated externally. As soon as the tube 5 passes through the external cooling device, the latter is also set in operation.

The tube 5 coming out of the die 2 has a very considerable tendency to adhere to the sealing surface 46 of the first sealing plug 12. In order to prevent this, it is provided for the sealing surface 46 to be cooled to a temperature of approximately less than 40° C. Cooling to below 40° C. has proven advantageous for the materials polyvinylchloride, polyethylene and polypropylene; PVC, PE and PP.

The thermal insulation member 45 prevents exchange of heat between the cooled sealing surface 46 and the inner mandrel 3.

When the tube 5 has progressed sufficiently far, the drawing device 10 is brought into engagement with the tube 5 and is set in operation.

As soon as the extrusion process is at all stable, the vacuum calibration device 6 is moved towards the extruder 1. Heat transfer between the die 2 and the vacuum calibration device 6 is undesirable. Therefore, in this example a gap is left between the die 2 and the vacuum calibration device 6. As an alternative, or in combination with the gap, it is possible to arrange an insulating member between the two components of the apparatus.

If the vacuum calibration device 6 is disposed closely downstream of the die 2, accurately controllable conditions are created for the tube 5 coming out of the die 2. The shape and the temperature, in particular, of the tube 5 can then be controlled well in practice.

The tube 5 is then severed at a location downstream of the drawing device 10, and the internal cooling member 15 is inserted into the open end of the tube 5. In order to push the internal cooling member 15 into the tube 5 as far as the die 2, use is made of a long, rod-shaped auxiliary tool. While the internal cooling member 15 is being pushed into the tube 5, the extruder 1, the vacuum calibration device 6, the external cooling device 9 and the drawing device 10 remain in operation. The internal cooling member 15 is then attached to the inner mandrel 3. The internal cooling of the tube 5 using the internal cooling device is then commenced. To achieve this cooling, cooling water is circulated in each of the compartments 20, 21 in the tube 5. Immediately downstream of the first sealing plug 12, the hot extruded tube 5 comes into direct contact with the cooling water in the compartment 20.

In order to cool the tube 5 uniformly, when seen in the circumferential direction of the tube 5, the compartment 20, and also the compartment 21, are completely filled with cooling water. When the cooling water comes into contact with the hot tube 5, air will escape from the cooling water and steam bubbles may be formed. These air bubbles and steam bubbles rise upwards and accumulate in the top of the compartments 20, 21. At the location where the air and steam accumulate there is no direct contact between the tube 5 and the cooling water, and the tube 5 will thus cool down to a lesser extent there than at other locations. At the location where the air bubbles and the steam bubbles are formed on the inner surface of the tube 5, it is possible to observe the effect that relatively cold cooling water continues to flow towards that location, with the result that this location, by contrast, cools down to a greater extent than other locations. In practice, this leads to a perceptible difference in length between the underside and the top of the extruded tube. With the apparatus described here, the air bubbles and the steam move towards the highest point of the compartment 20, 21 in question. The air and steam which accumulate there are removed from the compartment 20, 21 via the vent pipes 27, 28. These measures lead to a uniform internal cooling of the tube 5.

The cooling water in compartments 20, 21 is preferably kept at a slight excess pressure. This enables the air and steam to be discharged from the compartments 20, 21 more easily via the vent pipes 27, 28. Preferably, there is now a change from external vacuum calibration to excess-pressure calibration by eliminating the vacuum of the external calibration device 6. As an alternative, the level of the vacuum can be reduced and a combination of vacuum calibration and excess-pressure calibration can be used.

In order accurately to control the wall thickness and shape of the tube 5 coming out of the die 2, there is provision for the wall thickness and the shape of the cross-section of the tube to be measured directly downstream of the external calibration device 6, with the aid of the wall-thickness measuring device 30.

In a variant which is not shown of the internal cooling member 15 shown in FIG. 1, an additional sealing plug is provided between the second sealing plug 13 and the third sealing plug 14. The internal cooling member 15 is then provided with feed means for maintaining a circulation of cooling water in the compartment between the first sealing plug 12 and second sealing plug 13 and in the compartment between the additional sealing plug and the third sealing plug 14. In the compartment which is situated between the second sealing plug 12 and the additional sealing plug, there is preferably no cooling of the tube 5 as it passes by. This has the result that the tube, after a period of cooling, undergoes a period in which the temperatures in the wall of the tube can even out. This leads to the cooled inner layer of the tube being heated up, and hence to the internal temperature differences being reduced. By adapting the progress of the internal cooling of the tube 5 and by adapting the internal cooling and the external cooling to one another, the stresses produced in the wall of the tube 5 can be controlled. Obviously, the internal cooling member 15 may be provided with even more sealing plugs in order to form a still greater number of cooling compartments and evening-out compartments situated between them. Such an alternation between internal cooling and temperature evening is particularly advantageous if the cooling is intensive, specifically if a much colder (liquefied) gas is used for cooling, rather than the above-described cooling water.

Particularly when extruding polyolefin tubes, the extruded mass of plastic material comes out of the die 2 at a speed which is lower than the speed of the tube at the location of the drawing device 10. As a result, the wall thickness of the tube 5 decreases over a stretch which is downstream of the die 2, and thus the diameter of the tube 5 also becomes smaller, which effect is known as constriction. In order in this case to ensure that the first liquid-filled compartment 20 is reliably sealed with respect to the inner mandrel 3, the first sealing plug 12 is arranged at a greater distance from the inner mandrel 3 than that which is shown in FIG. 1. It is important, however, that an axial distance remains between the first sealing plug 12 and the calibration device 6, in order to prevent the plastic material from getting stuck between these two parts.

An expansion mandrel can also be added to the above-described apparatus in order to effect a radial expansion of the extruded tube, so as to obtain a specific orientation of the plastic material. In this case, the expansion mandrel may also function simultaneously as a sealing plug for a liquid-filled compartment.

What is claimed is:

1. Method for producing a hollow plastic section, comprising the extrusion of a hollow section made of thermoplastic material using an extruder which is provided with a die, which die has an inner mandrel for forming a cavity in the plastic section, said die being arranged for extrusion of said plastic section in a substantially horizontal direction, the plastic section being cooled internally by circulating cooling liquid through a compartment, which is filled with cooling liquid, in the cavity of the plastic section, which compartment is delimited by a first sealing plug and a second sealing plug, which sealing plugs are situated downstream of the inner mandrel and at a distance from one another, are attached to the inner mandrel and are adapted to bear against the plastic section in a sealing manner during operation, wherein the first and second sealing plugs are vertically offset from each other, so that a lower sealing plug and an upper sealing plug are obtained and said plastic section passes said first and second sealing plugs at an incline having an angle with respect to the horizontal, whereby the liquid filled compartment has a highest point close to the upper sealing plug, and wherein the method further comprises the use of vent means for discharging from said liquid filled compartment gas or vapour which collects close to said upper sealing plug at said highest point of said liquid filled compartment.

2. Method according to claim 1, wherein the first sealing lug is fixed to the inner mandrel and wherein the second sealing plug forms part of an internal cooling member which can be releasably connected to the inner mandrel, and wherein the method comprises the use of an external vacuum calibration device downstream of the die for calibrating the outer circumference of the plastic section and the use of a drawing device which engages on the plastic section and draws the section from the die, the method further comprising a start-up procedure having the following steps:

setting the extruder in operation without attaching the internal cooling member to the inner mandrel and with the external calibration device at a distance away from the die, extruding the section and setting the external vacuum calibration device in operation, bringing the drawing device into engagement with the section, which is optionally being cooled by the external cooling device, moving the external calibration device closer to the die, introducing the internal cooling member into the section at a location which is downstream of the drawing device and attaching it to the inner mandrel, and setting the internal cooling device in operation, an excess pressure being exerted on the interior of the section.

3. Method according to claim 2, in which that part of the first sealing plug which comes into contact with the extruded section is cooled to a temperature which is approximately 40° C. or lower.

4. Method according to claim 1, further including feed means for filling the compartment with a liquid, so that during operation of the apparatus a liquid filled compartment is established in said plastic section, said liquid filled compartment has a highest point at a predetermined position, and includes a vent for discharging gas from said liquid filled compartment.

5. Method according to claim 4, wherein said plastic section passes said sealing plugs at an angle with respect to the horizontal of less than 3°.

6. Method according to claim 4, wherein the liquid feed means provide above atmospheric pressure in the liquid filled compartment.

7. Method according to claim 4, wherein said plastic section further includes an external calibration device for calibrating the outer surfaces of the plastic section.

8. Method according to claim 7, wherein said external calibration device is displaceable with respect to the extruder in the direction of extrusion.

9. Method according to claim 7, wherein said external calibration device is a vacuum calibration device.

10. Method according to claim 4, wherein said external liquid-feed means are provided between the die and the external calibration device for applying a film of liquid to the outside of the plastic section.

11. Method according to claim 7, wherein external liquid-feed means are provided between the die and the external calibration device for applying a film of liquid to the outside of the plastic section, and in which liquid-discharge means are provided between the die and the liquid-feed means.

12. Method according to claim 7, wherein an external cooling device is provided downstream of the external calibration device.

13. Method according to claim 4, wherein at least four sealing plugs are provided, said sealing plugs being positioned at a distance from one another and delimit at least three compartments in the plastic section for cooling said plastic, further including cooling liquid circulation means for circulating cooling liquid in at least two axially spaced apart cooling compartments defined by said sealing plugs, and in which there is a compartment in between said cooling compartments in which, during operation, no cooling of the plastic section is effected.

14. Method according to claim 4, further including an additional sealing plug at a distance downstream of said second sealing plug which delimits a liquid-filled compartment, said additional sealing plug delimiting a liquid-suction compartment, and further providing suction means for removing liquid from the liquid-suction compartment.

15. Method according to claim 4, further including vent means for discharging from said liquid filled compartment gas or vapor which collects at said highest point of said liquid filled compartment, and wherein a wall-thickness measuring device is provided for measuring the wall thickness of the plastic section.

16. Method according to claim 15, wherein said wall-thickness measuring device is disposed directly downstream of an external calibration device.

17. Method according to claim 15, wherein said wall-thickness measuring device is located between the first and second sealing plug at a distance away from the highest point of said liquid-filled compartment.

18. Method according to claim 4, wherein said first sealing plug is fixed to the inner mandrel with a thermal insulation member, and in which each sealing plug disposed further downstream forms part of a unit which can be releasably connected to the inner mandrel.

19. A method for producing a hollow plastic section, comprising the extrusion of a hollow section made of thermoplastic material using an extruder which is provided with a die, which die has an inner mandrel for forming a cavity in the plastic section, said die being arranged for extrusion of said plastic section in a substantially horizontal direction, the plastic section being cooled internally by circulating cooling liquid through a compartment, which is filled with cooling liquid, in the cavity of the plastic section, which compartment is delimited by a first sealing plug and a second sealing plug, which sealing plugs are situated downstream of the inner mandrel and at a distance from one another, are attached to the inner mandrel and are adapted to bear against the plastic section in a sealing manner during operation, wherein the plastic section is guided along a path which is such that the liquid-filled compartment in the cavity of the plastic section has a highest point, and wherein gas or vapour which collects at the highest point of the liquid-filled compartment is discharged from the said compartment, and wherein the first sealing plug is fixed to the inner mandrel and wherein the second sealing plug forms part of an internal cooling member which can be releasably connected to the inner mandrel, and wherein the method comprises the use of an external vacuum calibration device downstream of the die for calibrating the outer circumference of the plastic section and the use of a drawing device which engages on the plastic section and draws the section from the die, the method further comprising a start-up procedure having the following steps:

setting the extruder in operation without attaching the internal cooling member to the inner mandrel and with the external calibration device at a distance away from the die, extruding the section and setting the external vacuum calibration device in operation, bringing the drawing device into engagement with the section, moving the external calibration device closer to the die, introducing the internal cooling member into the section at a location which is downstream of the drawing device and attaching the internal cooling member to the inner mandrel, and setting the internal cooling device in operation, an excess pressure being exerted in the liquid-filled compartment.

20. The method according to claim 19, in which that part of the first sealing plug which comes into contact with the extruded section is cooled to a temperature which is approximately 40° C. or lower.

21. The method according to claim 19, wherein external liquid-feed means are provided between the die and the external calibration device for applying a film of liquid to the outside of the plastic section.

22. The method according to claim 19, wherein external liquid-feed means are provided between the die and the external calibration device for applying a film of liquid to the outside of the plastic section, and wherein liquid discharge means are provided between the die and the liquid-feed means.

23. The method according to claim 19, wherein an additional sealing plug is provided downstream of said two sealing plugs delimiting the liquid-filled compartment, said additional sealing plug delimiting a liquid-suction compartment, and further providing suction means for removing liquid from the liquid-suction compartment.

24. The method according to claim 19, further providing a wall thickness measuring device for measuring the wall thickness of plastic section between the first and second sealing plug.

\* \* \* \* \*